United States Patent
Lee et al.

(10) Patent No.: US 9,867,026 B2
(45) Date of Patent: Jan. 9, 2018

(54) METHOD FOR DISCOVERING DEVICE IN WIRELESS ACCESS SYSTEM AND DEVICE THEREFOR

(71) Applicant: LG ELECTRONICS INC., Seoul (KR)

(72) Inventors: Jihyun Lee, Anyang-si (KR); Inkwon Seo, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 201 days.

(21) Appl. No.: 14/411,223

(22) PCT Filed: Mar. 29, 2013

(86) PCT No.: PCT/KR2013/002632
§ 371 (c)(1),
(2) Date: Dec. 24, 2014

(87) PCT Pub. No.: WO2014/014183
PCT Pub. Date: Jan. 23, 2014

(65) Prior Publication Data
US 2015/0327046 A1    Nov. 12, 2015

Related U.S. Application Data

(60) Provisional application No. 61/673,234, filed on Jul. 18, 2012.

(51) Int. Cl.
*H04W 8/00* (2009.01)
*H04W 76/02* (2009.01)
*H04W 56/00* (2009.01)

(52) U.S. Cl.
CPC ......... *H04W 8/005* (2013.01); *H04W 56/002* (2013.01); *H04W 76/023* (2013.01)

(58) Field of Classification Search
None
See application file for complete search history.

(56) References Cited

U.S. PATENT DOCUMENTS

2010/0290389 A1    11/2010    Hou et al.
2011/0092234 A1    4/2011     Kim et al.
(Continued)

FOREIGN PATENT DOCUMENTS

KR    10-2011-0041768 A    4/2011
KR    10-2011-0103852 A    9/2011
(Continued)

*Primary Examiner* — Huy D Vu
*Assistant Examiner* — Hong Shao
(74) *Attorney, Agent, or Firm* — Birch, Stewart, Kolasch & Birch, LLP

(57) ABSTRACT

Disclosed are a device discovery method for device-to-device (D2D) communication in a wireless access system supporting D2D communication and a device therefor. Particularly, the device discovery method can comprise the steps of: enabling a first device in an idle mode to receive a paging message from a base station; enabling the first device to switching to an active mode if the paging message indicates the first device; enabling the first device to monitor a discovery signal transmitted from a second device if the paging message indicates that the first device operates in a reception mode with respect to transmission and reception of the discovery signal; enabling the first device to perform a random access procedure with the base station if the first device receives the discovery signal; enabling the first device to perform a connection establishment procedure with the base station after completing the random access procedure; and enabling the first device to transmit, to the base station, a D2D discovery report after completing the connection establishment procedure.

10 Claims, 14 Drawing Sheets

(56) References Cited

U.S. PATENT DOCUMENTS

| | | |
|---|---|---|
| 2011/0223953 A1 | 9/2011 | Lee et al. |
| 2012/0076023 A1 | 3/2012 | Ko et al. |
| 2012/0099499 A1 | 4/2012 | Jang et al. |
| 2013/0122893 A1* | 5/2013 | Turtinen ............... H04W 8/005 455/423 |
| 2013/0157656 A1* | 6/2013 | Gao .................... H04W 76/023 455/434 |
| 2013/0157670 A1* | 6/2013 | Koskela .............. H04W 74/006 455/450 |
| 2013/0195026 A1* | 8/2013 | Johnsson .......... H04W 72/0493 370/329 |

FOREIGN PATENT DOCUMENTS

| | | |
|---|---|---|
| KR | 10-2012-0024778 A | 3/2012 |
| KR | 10-2012-0041902 A | 5/2012 |
| KR | 10-2012-0047759 A | 5/2012 |

* cited by examiner

METHOD FOR DISCOVERING DEVICE IN WIRELESS ACCESS SYSTEM AND DEVICE THEREFOR

CROSS REFERENCE TO RELATED APPLICATIONS

This application is the National Phase of PCT/KR2013/002632 filed on Mar. 29, 2013, which claims priority under 35 U.S.C. 119(e) to U.S. Provisional Application No. 61/673,234 filed on Jul. 18, 2012, all of which are hereby expressly incorporated by reference into the present application.

TECHNICAL FIELD

This disclosure relates to a wireless communication system, and more particularly, to a method for discovering a counterpart device for device-to-device communication in a wireless access system supporting device-to-device communication and a device therefor.

BACKGROUND ART

In cellular communications, a user equipment (UE) existing in a cell accesses a base station, receives control information for exchange of data from a base station, and then transceives data with the base station in order to perform communication. In particular, the UE transceives data through the base station, and accordingly in order for the UE to transmit data to another cellular UE, the UE transmits its data to the base station and the base station in turn transmits the received data to another UE. Since UEs can only transmit data to another UE via the base station, the base station performs scheduling of channels and resources for data transmission and reception and transmits the information about the channel and resource scheduling to each UE. Thus, in order to perform UE-to-UE communication via the base station, each UE needs to have channel and resource allocations for data transmission and reception from the base station. In device-to-device communication, on the other hand, one UE directly transmits and receives signals with another UE to which the UE intends to transmit data, without using a base station or a relay node.

DISCLOSURE

Technical Problem

An object of the present invention is to provide a method for smoothly discovering a counterpart UE for device-to-device communication in a wireless access system, preferably a wireless access system supporting device-to-device communication and an apparatus therefor.

Another object of the present invention is to provide a method for smoothly discovering a counterpart UE while minimizing energy consumption of a UE and an apparatus therefor.

It is to be understood that technical objects to be achieved by the present invention are not limited to the aforementioned technical object and other technical objects which are not mentioned herein will be apparent from the following description to one of ordinary skill in the art to which the present invention pertains.

Technical Solution

The object of the present invention can be achieved by providing a device discovery method for device-to-device (D2D) communication in a wireless access system supporting the D2D communication, the device discovery including a first device in an idle mode receiving a paging message from a base station, the first device switching to an active mode when the paging message indicates the first device, the first device monitoring a discovery signal transmitted from a second device when the paging message indicates operation of the first device in a receive mode in relation to transmission and reception of the discovery signal, the first device performing a random access procedure with the base station when the first device receives the discovery signal, the first device performing a connection establishment procedure after the first device completes the random access procedure, and the first device transmitting a D2D discovery report message to the base station after the first device completes the connection establishment procedure.

In another aspect of the present invention, provided herein is a method for receiving a first device for performing device discovery for device-to-device (D2D) communication in a wireless access system supporting the D2D communication, the first device including a radio frequency (RF) unit for transceiving a radio signal, and a processor, wherein the processor is configured to receive a paging message from a base station while the first device is in an idle mode, switch the first device to an active mode when the paging message indicates the first device, monitor a discovery signal transmitted from a second device when the paging message indicates operation of the first device in a receive mode in relation to transmission and reception of the discovery signal, perform a random access procedure with the base station when the discovery signal is received, perform a connection establishment procedure after the random access procedure is completed, and transmit a D2D discovery report message to the base station after the connection establishment procedure is completed.

Preferably, the first device may switch to the idle mode when the first device fails to receive the discovery signal.

Preferably, the first device may transmit the discovery signal to the second device when the paging message indicates operation of the first device in a transmit mode in relation to transmission and reception of the discovery signal, wherein the D2D discovery report message is transmitted to the base station by the second device.

Preferably, the paging message may include an identifier (ID) of the second device or a service ID related to the first device.

Preferably, the paging message may include at least one of an indicator for indicating that the paging message is intended for the D2D communication, resource information used to transmit the discovery signal, type information about the discovery signal, an antenna port number for transmission of the discovery signal and a sequence parameter of the discovery signal.

Preferably, the paging message may be transmitted over a physical downlink control channel (PDCCH), the PDCCH using a D2D-paging-radio network temporary identifier (DP-RNTI).

Preferably, the D2D discovery report message may include at least one of indication information about whether or not discovery of the first device is successful and channel information measured through the discovery signal.

Advantageous Effects

According to embodiments of the present invention, a UE may smoothly discover a counterpart UE to perform deviceto-device communication in a wireless access system, preferably in a wireless access system supporting device-to-device communication.

According to embodiments of the present invention, a UE is allowed to perform a random access procedure only when it succeeds in discovering the counterpart UE. Thereby, the UE may smoothly discover the counterpart UE with minimized energy consumption.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
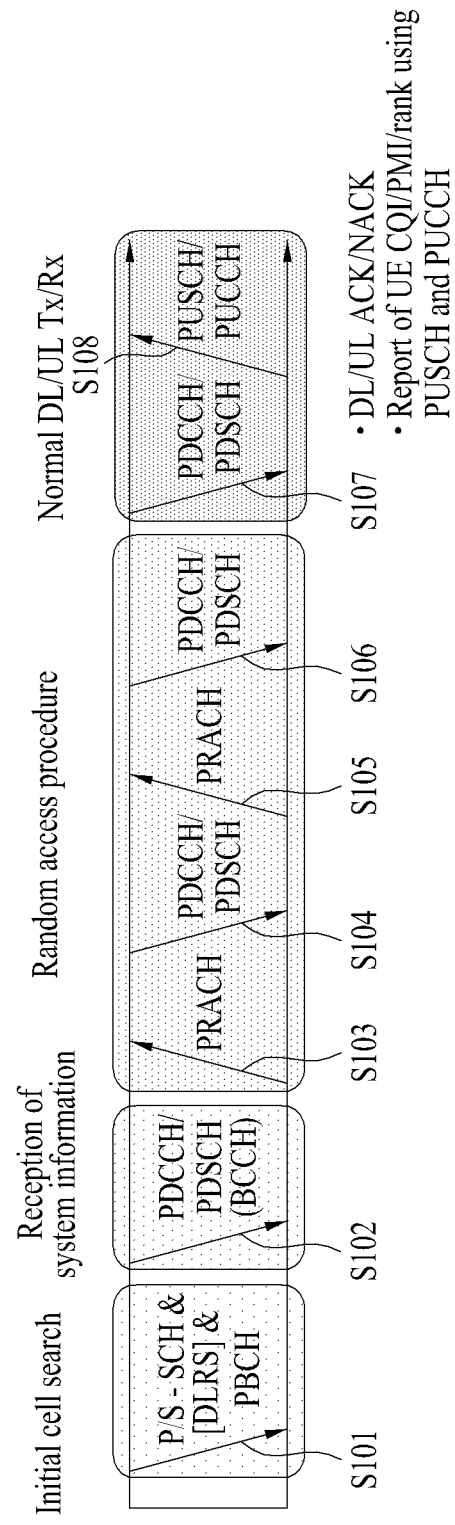
FIG. 1 is a diagram illustrating physical channels used for the 3GPP LTE system and a typical method for transmitting signals using the same.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to present only embodiments that can be implemented according to the invention. The following detailed description includes specific details in order to provide a thorough understanding of the present invention. However, it will be apparent to those skilled in the art that the present invention may be practiced without such specific details.

In some cases, well-known structures and devices may be omitted in order to avoid obscuring the concepts of the present invention, and important functions of the structures and devices may be mainly illustrated in the form of block diagrams.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary. That is, it is obvious that various operations performed to implement communication with the terminal over a network composed of multiple network nodes including a base station can be conducted by the base station or network nodes other than the base station. The term "base station (BS)" may be replaced with terms such as "fixed station," "Node-B," "eNode-B (eNB)," and "access point." The term "relay" may be replaced with such terms as "relay node (RN)" and "relay station (RS)". The term "terminal" may also be replaced with such terms as "user equipment (UE)," "mobile station (MS)," "mobile subscriber station (MSS)," "subscriber station (SS)", "advanced mobile station (AMS)," "wireless terminal (WT)," "machine-type communication (MTC) device," "machine-to-machine (M2M) device," "device-to-device (D2D) device."

It should be noted that specific terms used in the description below are intended to provide better understanding of the present invention, and these specific terms may be changed to other forms within the technical spirit of the present invention.

Exemplary embodiments of the present invention can be supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. That is, steps or parts which are not described in the embodiments of the present invention so as not to obscure the technical spirit of the present invention may be supported by the above documents. All terms used herein may be supported by the aforementioned standard documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through radio technologies such as universal terrestrial radio access (UTRA) or CDMA2000. TDMA may be embodied through radio technologies such as global system for mobile communication (GSM)/general packet radio service (GPRS)/enhanced data rates for GSM evolution (EDGE). OFDMA may be embodied through radio technologies such as IEEE 802.11 (Wi-Fi), IEEE 802.16 (WiMAX), IEEE 802-20, and evolved UTRA (E-UTRA). UTRA is a part of the universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE.

For clarity, the following description mainly focuses on 3GPP LTE/LTE-A, but technical features of the present invention are not limited thereto.

3GPP LTE/LTE-A system to which the present invention is applicable

FIG. 1 is a diagram illustrating physical channels used for the 3GPP LTE system and a typical method for transmitting signals using the same.

If a UE is turned on or enters a new cell, the UE performs an initial cell search operation including synchronization with a base station in step S101. To this end, the UE receives a primary synchronization channel (P-SCH) and a secondary synchronization channel (S-SCH) from the base station, synchronizes with the base station and then acquires information such as a cell ID.

Thereafter, the UE may receive a physical broadcast channel (PBCH) from the base station and acquire intra-cell broadcast information. The UE may receive a downlink reference signal (DL RS) and check a DL channel state in the step of initial cell search.

After completing initial cell search, the UE may receive a physical downlink control channel (PDCCH) and a physical downlink shared channel (PDSCH) according to the PDCCH information and acquire detailed system information in step S102.

Thereafter, the UE may perform a random access procedure to complete the access to the base station in steps S103 to S106. To this end, the UE may transmit a preamble over a physical random access channel (PRACH) (S103), and then receive a response message for the preamble on a PDCCH and a corresponding PDSCH (S104). In the case of a contention-based random access, the UE may perform a contention resolution procedure such as transmission of an additional PRACH (S105) and reception of a PDCCH signal and a corresponding PDSCH signal (S106).

After performing the procedure described above, the UE may perform reception of a PDCCH signal and/or a PDSCH signal (S107) and transmission of a physical uplink shared channel (PUSCH) signal and/or a physical uplink control channel (PUCCH) (S108) as a typical uplink/downlink signal transmission procedure.

Control information that a UE transmits to a base station may be commonly named uplink control information (UCI). The UCI includes HARQ-ACK/NACK (hybrid automatic repeat and request acknowledgement/negative-ACK), SR (scheduling request), CQI (channel quality indication), PMI (precoding matrix indication), and RI (rank indication) information.

In the LTE system, the UCI is generally transmitted periodically over the PUCCH. However, in the case in which both control information and traffic data need to be simultaneously transmitted, the UCI may be transmitted on the PUSCH. In addition, the UCI may be a periodically transmitted over the PUSCH according to a request/indication from a network.

Figure 2:
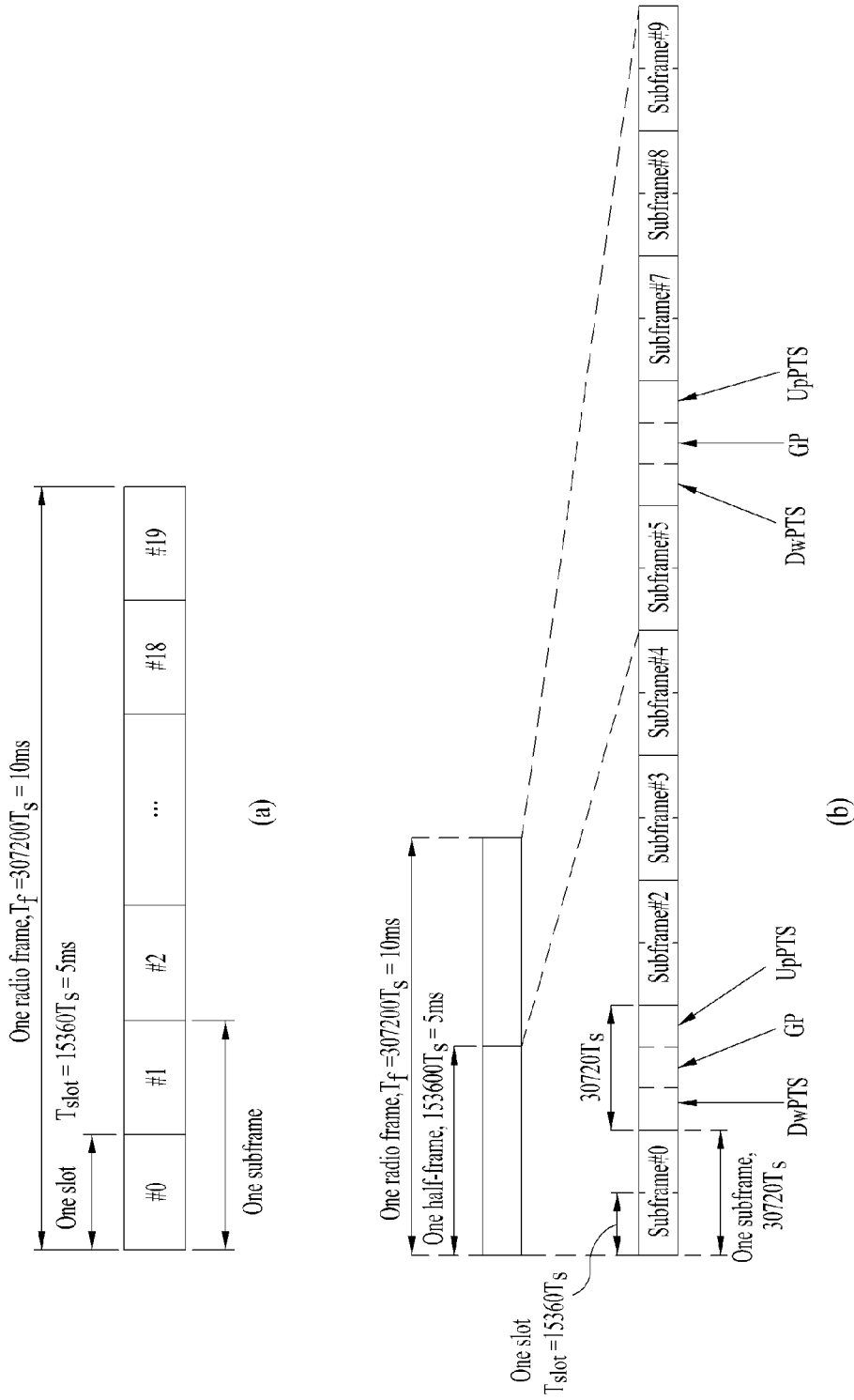
FIG. 2 illustrates a structure of a radio frame in 3GPP LTE.

FIG. 2 illustrates a structure of a radio frame in 3GPP LTE.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports radio frame structure type 1 applicable to frequency division duplex (FDD) and radio frame structure type 2 applicable to time division duplex (TDD).

FIG. 2(a) illustrates radio frame structure type 1. A downlink radio frame is divided into 10 subframes. Each subframe includes two slots in the time domain. The duration of transmission of one subframe is defined as a transmission time interval (TTI). For example, a subframe may have a duration of 1 ms, and one slot may have a duration of 0.5 ms. A slot may include a plurality of orthogonal frequency division multiplexing (OFDM) symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or symbol period. A resource block (RB), which is a resource allocation unit, includes a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, each slot may include 7 OFDM symbols. For an extended CP configuring each OFDM symbol, the duration of each OFDM symbol is extended and thus the number of OFDM symbols included in a slot is smaller than in the case of the normal CP. For the extended CP, each slot may include, for example, 6 OFDM symbols. When a channel state is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other OFDM symbols may be allocated to a physical downlink shared channel (PDSCH).

FIG. 2(b) illustrates radio frame structure type 2. A type-2 radio frame includes two half frames, each of which has 5 subframes, downlink pilot time slots (DwPTSs), guard periods (GPs), and uplink pilot time slots (UpPTSs). Each subframe consists of two slots. The DwPTS is used for initial cell search, synchronization, or channel estimation in a UE, whereas the UpPTS is used for channel estimation in an eNB and UL transmission synchronization of a UE. The GP is provided to eliminate UL interference caused by multipath delay of a DL signal between DL and UL.

The illustrated radio frame structures are merely examples, and various modifications may be made to the number of subframes included in a radio frame, the number of slots included in a subframe, or the number of symbols included in a slot.

Figure 3:
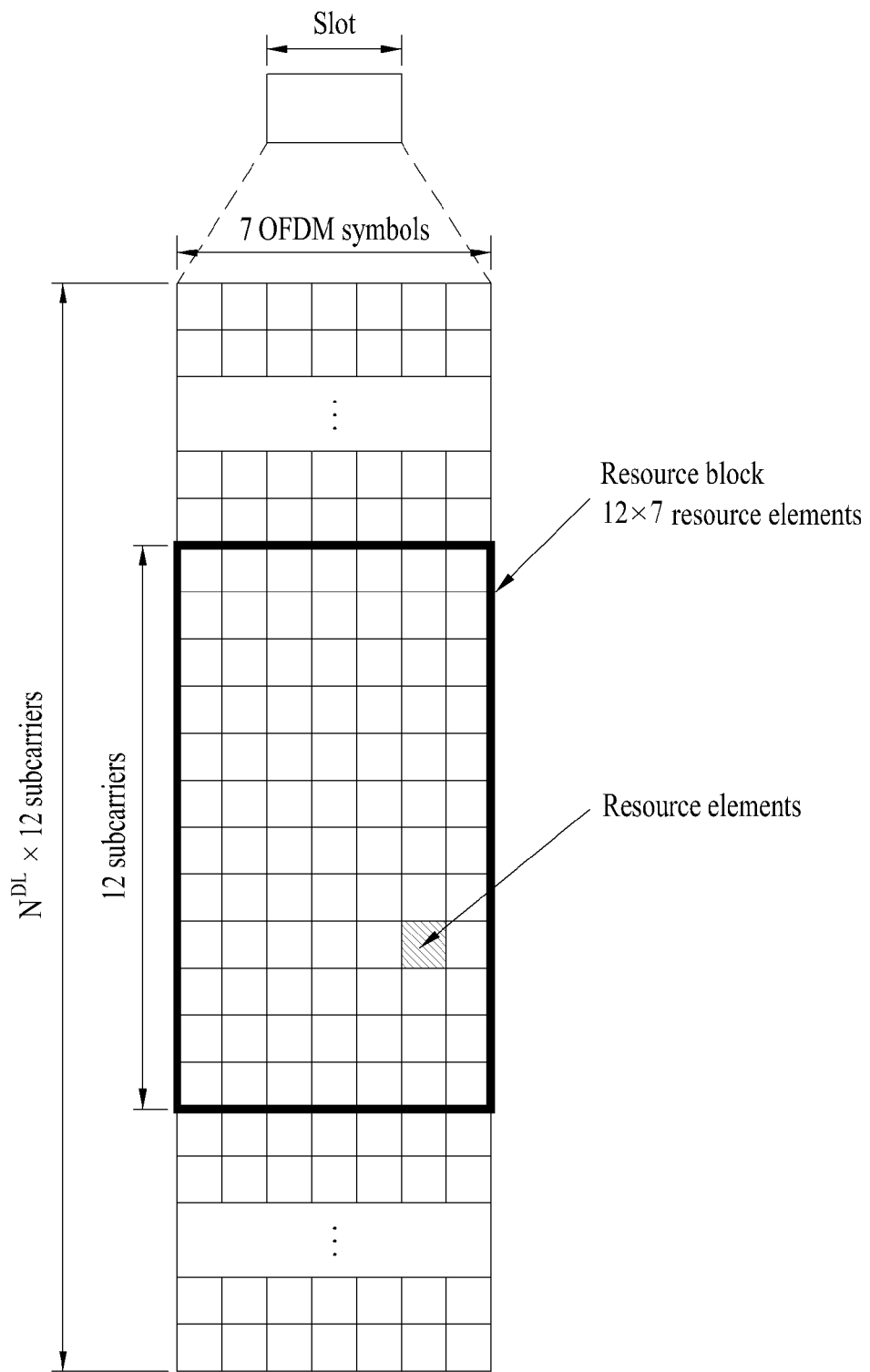
FIG. 3 is a diagram illustrating a resource grid for a downlink (DL) slot.

FIG. 3 illustrates a resource grid of a DL slot.

Referring to FIG. 3, one DL slot includes a plurality of OFDM symbols in the time domain. In this example, one DL slot includes 7 OFDM symbols, and one RB includes 12 subcarriers in the frequency domain. However, embodiments of the present invention are not limited thereto.

Each element in the resource grid is referred to as a resource element (RE). An RB includes 12×7 REs. The number of RBs included in a DL slot, i.e., NDL depends on the DL transmission bandwidth. A UL slot may have the same structure as the DL slot.

Figure 4:
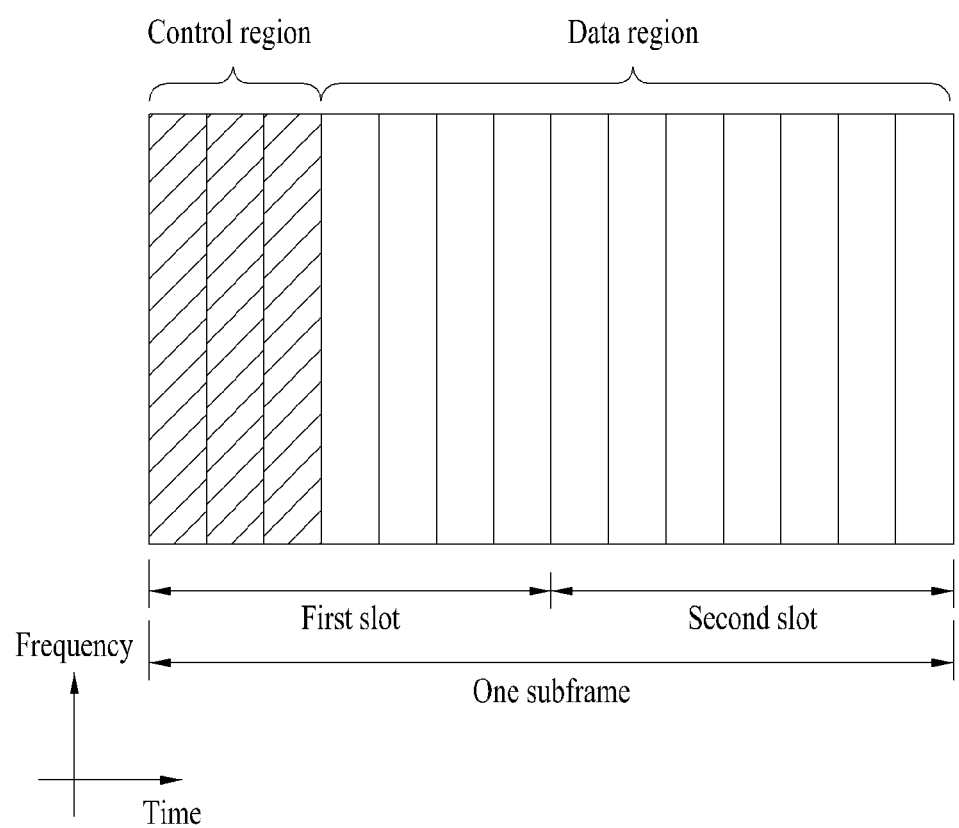
FIG. 4 is a diagram illustrating a structure of a DL subframe.

FIG. 4 illustrates a DL subframe structure.

Referring to FIG. 4, up to three OFDM symbols in the leading part of the first slot in a DL subframe correspond to a control region to which control channels are allocated. The other OFDM symbols of the DL subframe correspond to a data region to which a physical downlink shared channel (PDSCH) is allocated. DL control channels used in 3GPP LTE include, for example, a physical control format indicator channel (PCFICH), a physical downlink control channel (PDCCH), and a physical hybrid ARQ indicator channel (PHICH).

The PCFICH is transmitted in the first OFDM symbol of a subframe, carrying information about the number of OFDM symbols (i.e., the size of the control region) used for transmission of control channels in the subframe. The PHICH, which is a response channel to uplink, carries an ACK/NACK signal for a hybrid automatic repeat request (HARQ). Control information transmitted over the PDCCH is called downlink control information (DCI). The DCI includes UL resource allocation information, DL resource allocation information, or a UL transmit (Tx) power control command for a UE group.

The PDCCH may carry the resource allocation and transmission format information about a DL shared channel (DL-SCH), which is referred to as DL grant, and resource allocation information about a UL shared channel (UL-SCH), which is referred to as UL grant, paging information on a paging channel (PCH), system information on the DL-SCH, information about resource allocation for a higher-layer control message such as a random access response transmitted on the PDSCH, a set of Tx power control commands for individual UEs in a UE group, and voice over IP (VoIP) activation information. A plurality of PDCCHs may be transmitted in the control region, and a UE may monitor the PDCCHs. A PDCCH is configured by one control channel element (CCE) or a set of multiple consecutive CCEs. A CCE is a logical allocation unit used to provide a PDCCH with a coding rate according to the state of a radio channel. A CCE corresponds to a plurality of RE groups. The format of a PDCCH and the number of available bits for the PDCCH are determined depending on the correlation between the number of CCEs and the coding rate provided by the CCEs.

An eNB determines the PDCCH format according to DCI to be transmitted to the UE and attaches a cyclic redundancy check (CRC) to the control information. The CRC is masked with a unique identifier (referred to as a radio network temporary identifier (RNTI)) according to the owner or usage of the PDCCH. If the PDCCH is intended for a specific UE, a unique identifier of the UE, e.g., a cell-RNTI (C-RNTI) may be masked on the CRC. If the PDCCH is for a paging message, a paging indicator identifier, e.g., a paging-RNTI (P-RNTI) may be masked on the CRC. If the PDCCH is for system information, more specifically a system information block (SIB), a system information RNTI (SI-RNTI) may be masked on the CRC. To indicate a random access response, which is a response to transmission of a random access preamble, a random access-RNTI (RA-RNTI) may be masked on the CRC.

Figure 5:
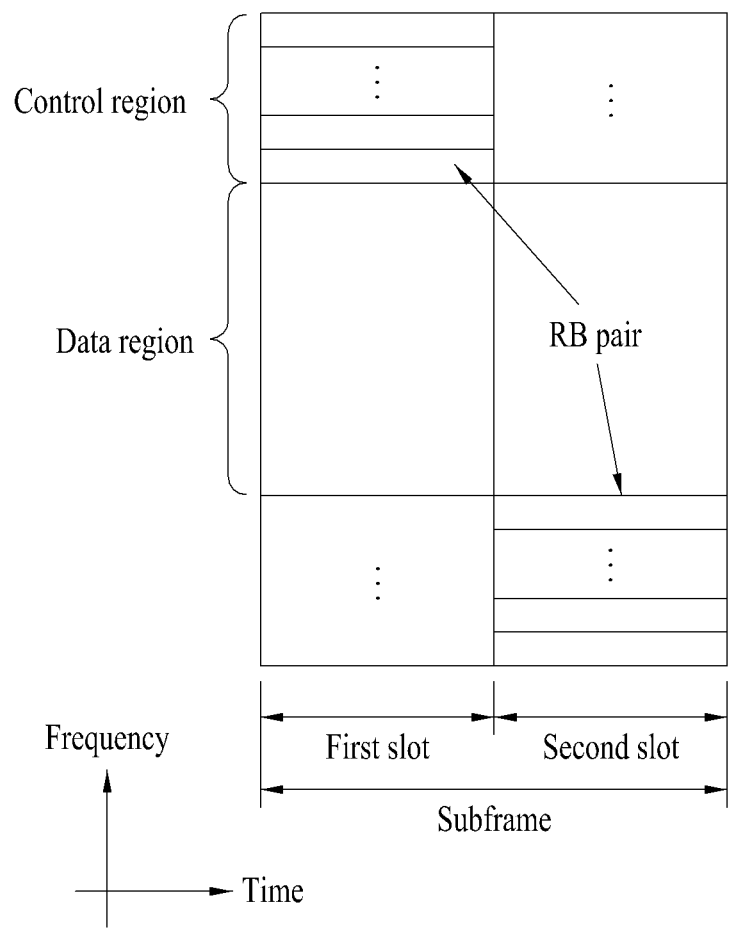
FIG. 5 is a diagram illustrating a structure of an uplink (UL) subframe.

FIG. 5 illustrates a UL subframe structure.

Referring to FIG. 5, a UL subframe may be divided into a control region and a data region in the frequency domain. A physical uplink control channel (PUCCH) carrying uplink control information is allocated to the control region. A physical uplink shared channel (PUSCH) carrying user data is allocated to the data region. To maintain single carrier property, a UE does not transmit a PUSCH and a PUCCH simultaneously. A PUCCH for a UE is assigned an RB pair in a subframe. The RBs of an RB pair occupy different subcarriers in each of two slots. This is called frequency hopping of the RB pair allocated to the PUCCH over a slot boundary.

Improved Discovery Procedure for Device-to-Device Communication

Device-to-device direct communication refers to a method for two or more devices to transmit and receive data and/or control information through direct communication therebetween without using a base station in a situation in which the channel state between devices is good or the devices are adjacent to each other. The main purpose of device-to-device direct communication is to save power or radio resources, relative to communication between devices via a base station, by allowing devices which are located at a short distance from each other or have good channel statuses, to perform direct communication through a direct link therebetween. Device-to-device direct communication associated with the present invention differs from Bluetooth communication and infrared communication which allows exchange of data between devices without intervention of the base station in that data is exchanged between devices through direct communication, but predetermined control information is provided for device-to-device direct communication by the base station.

The term "device-to-device direct communication" may be used interchangeably with terms such as "device-to-device (D2D) communication," "machine-to-machine (M2M) communication," "machine-type communication (MTC)," "UE-to-UE communication," or "peer-to-peer (P2P) communication." Hereinafter, for simplicity of description of embodiments of the present invention, the term "D2D communication" will be consistently used throughout the specification. In addition, all nodes except D2D devices will be collectively referred to as a base station. For example, a relay node and an antenna node of a distributed antenna system (DAS) can all be referred to as base stations in a sense that they are access points to access a base station.

Idle mode of a UE refers to an operational state of the UE in which the UE keeps the receiver thereof switched off in order to reduce power consumption and extend the battery service life. The idle mode includes a state in which the UE periodically switches off the receiver according to a discontinuous reception (DRX) configuration in the RRC_connected mode and a state in which the UE periodically performs cell search in the RRC_idle mode.

Paging refers to informing a UE in the idle mode that there is an incoming call. The UE set in the idle mode performs discontinuous reception (DRX) in order to reduce power consumption. To this end, a network configures multiple paging occasions on a time cycle called a paging DRC cycle, and a specific UE receives paging only on specific paging occasions. The UE does not receive paging on occasions other than the specific occasions. One paging occasion may correspond to one TTI.

The UE monitors a PDCCH corresponding to paging on each designated paging occasion. That is, the UE wakes up on each paging occasion and receives the PDCCH. The PDCCH corresponding to paging refers to a PDCCH using a determined paging-RNTI (P-RNTI). In this regard, each UE group is not assigned a different P-RNTI, but the UE is configured to monitor paging in different radio frames or subframes. Accordingly, the UE monitors the PDCCH only at a UE-specific time, and switches off the receiver at the other times by applying DRX. When the UE is in the RRC_idle state, it may acquire system information (SI) while monitoring the paging channel.

The UE having received the paging receives a PDSCH region indicated by paging and determines whether or not the paging is intended therefor without switching off the receiver. Specifically, if the UE receives a P-RNTI corresponding to paging over a PDCCH, the UE receives radio resources (e.g., resource blocks (RBs)) indicated by the PDCCH. A paging detail (or a paging message) is included in the PDSCH resource block (RB) region indicated by paging of the PDCCH. The paging detail corresponds to UE identifier (ID) information (e.g., international mobile subscriber identity (IMSI)). If a UE ID included in the paging detail coincides with the ID of the UE, the UE performs the procedure of random access to the base station over a random access channel (RACH).

D2D discovery refers to a series of processes in which the UE discovers (or finds) another UE when the UE intends to establish a D2D link to another UE. The UE intending to establish D2D transmits or receives a discovery signal based on a discovery resource allocated by the base station. Upon receiving the discovery signal, the UE reports on whether or not the discovery is successful, and selectively reports, to the base station, on the state of the radio channel to the counterpart UE. Herein, a discovery signal is transmitted or received because a corresponding discovery resource is allocated to both a UE intending to establish D2D and a counterpart UE responding to the intention in common, and both UEs can transmit a discovery signal. Hereinafter, for simplicity of description, a UE that intends to initiate D2D may be referred to as a "source UE," and a counterpart UE operating in response may be referred to as a "target UE."

The present invention proposes a method to allow a UE in the idle mode to efficiently operate in terms of energy in performing the D2D discovery procedure described above.

A UE intending to discover a counterpart UE, namely a source UE intending to initiate D2D communication transmits a D2D request to a base station. Herein, the D2D request may or may not include an ID of the counterpart UE to perform D2D communication.

A D2D request message may be a notification (or an indication) that the source UE will transmit a discovery signal to the target UE or may correspond to a request for grant of transmission of the discovery signal to the target UE. Specifically, if a transmission resource of the discovery signal available to the source UE and the target UE is predetermined, this message may be interpreted as a notification. If the resource is under control of the base station (namely, if the discovery signal transmission resource needs to be allocated by the base station), the message may be interpreted as a request for permission to perform discovery signal transmission. In the latter case, the source UE may transmit a discovery signal to the target UE after obtaining permission from the base station (for example, after receiving a D2D discovery request message containing D2D configuration/discovery configuration information). Herein, the D2D configuration/discovery configuration refers to information about resources allocated for transmission of the discovery signal.

In this case, if the counterpart UE (i.e., the target UE) is in the idle mode, the discovery procedure may be performed using two methods described below.

In one method, the base station may wake up a target UE which is in the idle mode using the existing paging technique and allocate a discovery resource to the target UE such that the target UE discovers a discovery signal in the resource region.

In the other method, the base station may inform the target UE in the idle mode that a discovery request is made by another UE (i.e., a source UE), through paging. Since the target UE in the idle mode is monitoring paging, when the paging is detected at the time it is monitored, the target UE continuously receives the paging detail of a PDSCH. The paging detail may include a UE ID (i.e., the target UE ID) and D2D information (or paging information/discovery information). The D2D information may include information such as a D2D ID and a discovery configuration. A UE capable of performing D2D communication needs to receive the D2D information. Herein, the discovery configuration refers to information about resources allocated for transmission of the discovery signal as described above. The D2D ID may be an ID of a UE transmitting the discovery signal (namely, a UE/source UE requesting D2D communication) or a service ID. The service ID, which is an identifier related to a specific service, corresponds to a case in which the target UE having received the paging provides the service or subscribes to the service. Accordingly, in this case, the target UE corresponds to a plurality of UEs. A UE having received the paging including the D2D ID may perform the discovery process first rather than following the normal paging procedure. As described above, the discovery is a process of discovering a UE corresponding to the D2D ID using a resource designated through the discovery configuration. Herein, the discovery configuration (i.e., resource information for transmission and reception of a discovery signal) may not be designated through paging. The configuration may be set to a predetermined value, which may be pre-known to both the UE and the base station, and may use a value known to the UE as a part of the system information.

As described above, if the counterpart UE (i.e., the target UE) is in the idle mode, paging needs to be transmitted to the target UE which is in the idle mode in order to perform the discovery process. To this end, an existing paging channel (e.g., PDCCH) may be used, or a paging channel dedicated to D2D communication may be separately defined. In this regard, a paging channel transmitted from the base station or a D2D-dedicated paging channel will be described with reference to FIG. 6 in a comparative manner.

Figure 6:
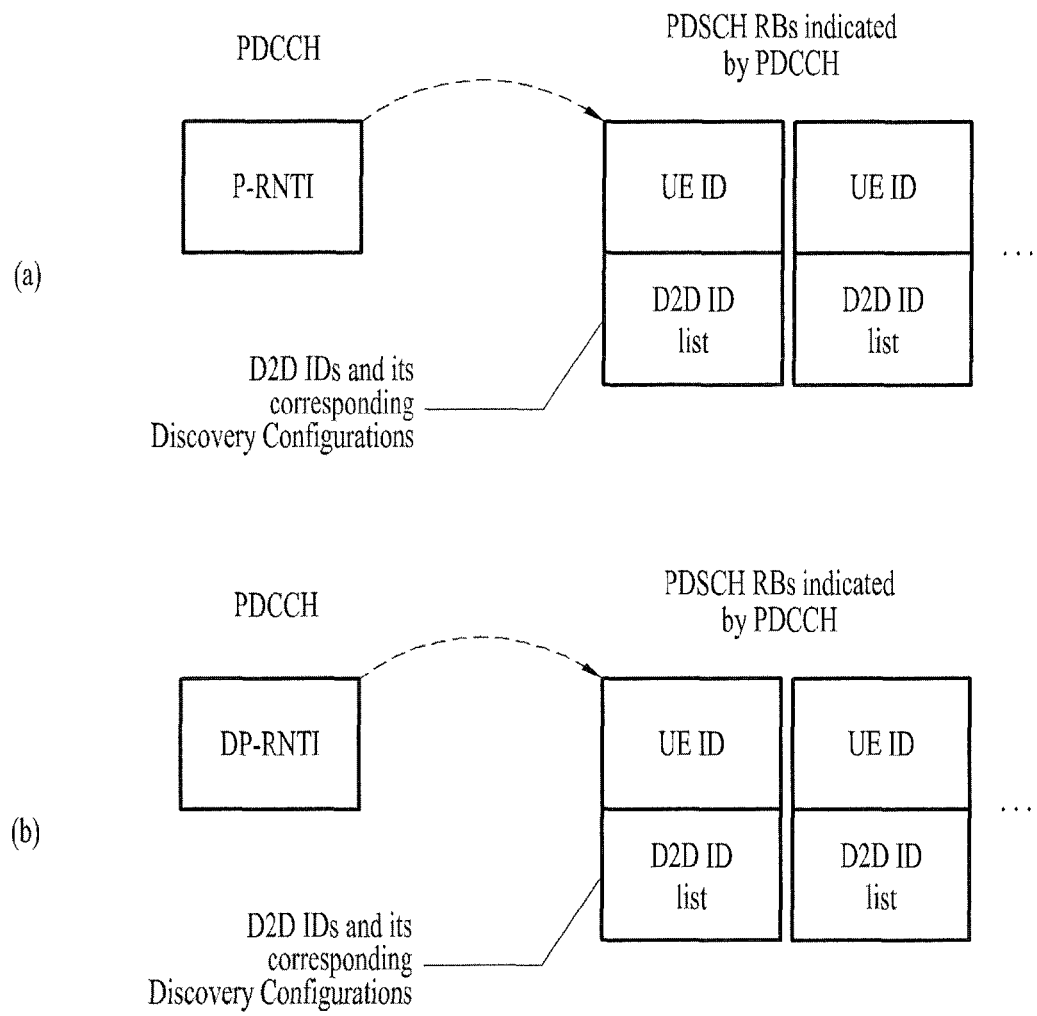
FIG. 6 is a diagram illustrating a paging channel according to one embodiment of the present invention.

FIG. 6 is a diagram illustrating a paging channel according to one embodiment of the present invention.

FIG. 6(a) illustrates utilization of a conventional paging channel. That is, the figure shows the PDCCH using a P-RNTI. UEs in the idle mode may monitor the PDCCH at determined times. Subsequently, a UE having detected the PDCCH which uses the P-RNTI needs to consecutively receive PDSCH RBs indicated by the PDCCH. The designated PDSCH RBs may include a UE ID (an ID of a UE receiving paging), a D2D ID (an ID of a UE/source UE having requested D2D communication or a service ID), and discovery configuration information for each D2D ID.

On the other hand, FIG. 6(b) illustrates a new control channel dedicated to D2D and use of a PDSCH for the same. For example, a PDCCH using a D2D-paging RNTI (DP-RNTI) may be defined such that UEs in the idle mode monitor the PDCCH at predetermined times. In this case, a UE having detected the PDCCH using the DP-RNTI needs to consecutively receive PDSCH RBs indicated by the PDCCH, as in the case of paging. The designated PDSCH RBs may include a UE ID (an ID of a UE receiving paging), a D2D ID (an ID of a UE/source UE having requested D2D communication or a service ID), and discovery configuration information for each D2D ID.

Two examples of the D2D discovery scheme described above will be described with reference to FIGS. 7 and 8.

Figure 7:
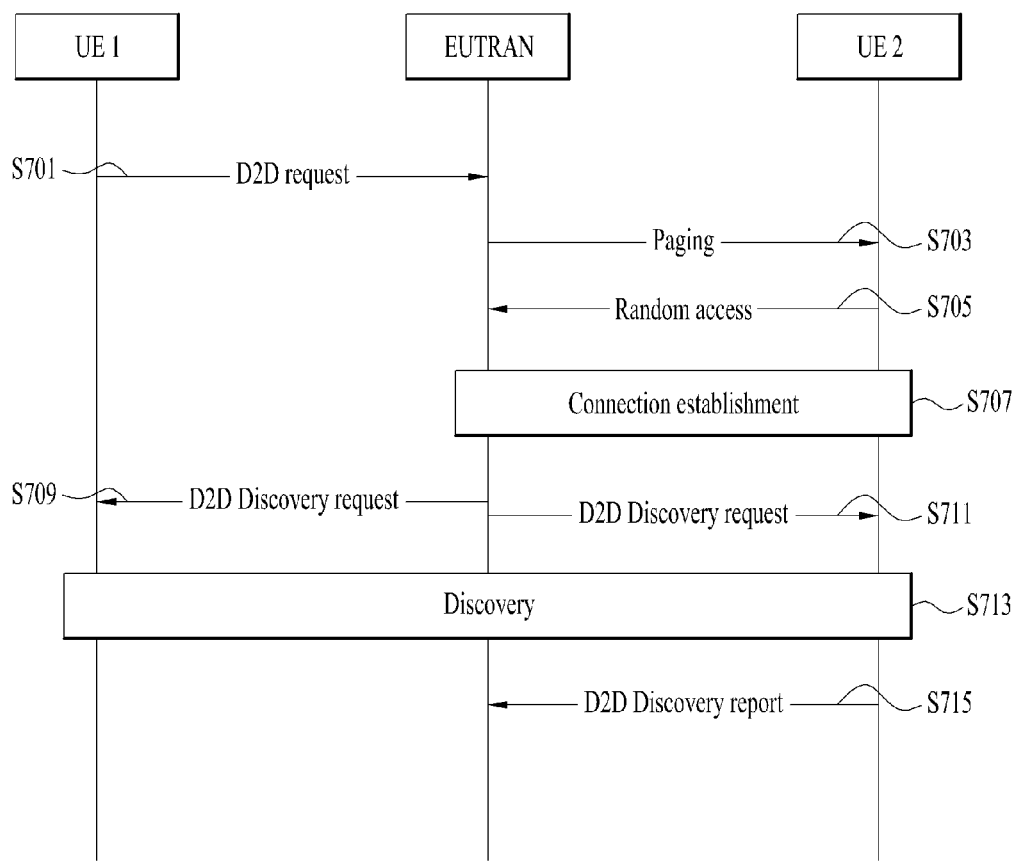
FIGS. 7 to 13 are diagrams illustrating a discovery procedure for device-to-device communication according to one embodiment of the present invention.

FIG. 7 is a diagram illustrating a discovery procedure for D2D communication according to one embodiment of the present invention. In FIG. 7, it is assumed that the UE 2 is currently in the idle mode, and UE 1 transmits a discovery signal to UE 2.

Referring to FIG. 7, UE 1 (a source UE) intending to perform D2D communication transmits a D2D request message to the base station (S701). The D2D request may or may not include the ID of a counterpart UE which UE 1 intends to perform D2D communication with.

Since UE 2 (a target UE), which is the counterpart UE, is in the idle mode, the base station transmits a paging (e.g., PDCCH) message to UE 2 at a predetermined time in order to wake up UE 2 (S703). The paging message may include a D2D ID (an ID of the UE (UE 1) having transmitted the D2D request in step S701 or a service ID) and/or discovery configuration information.

Upon receiving a P-RNTI or DP-RNTI corresponding to the paging message over the PDCCH, the target UE (UE 2)

checks a paging detail included in a PDSCH RB region indicated by the PDCCH to determine whether the paging detail is intended therefor (namely, whether the detail coincides with the ID of UE 2). If it is determined that the paging detail is intended for the target UE, the UE performs a random access procedure with the base station (S705). Subsequently, UE 2 performs connection setup/establishment with the base station (S707).

When the base station completes the connection establishment procedure with UE 2, the base station transmits a D2D discovery request message to UE 1 and UE 2 (S709 and S711). Herein, the discovery request message may include an ID of the UE (UE 1) having transmitted the D2D request in step S701 and/or D2D configuration/discovery configuration information. The base station may transmit the D2D discovery request message to the UEs at the same time. Thereafter, UE1, having received the D2D discovery request message from the base station, transmits a discovery signal through the resource allocated by the base station, and UE 2 performs the discovery procedure while monitoring the discovery signal through the allocated resource (S713).

UE 2 transmits a D2D discovery report message to the base station (S615). Herein, the D2D discovery report message may contain information about whether or not discovery is successful (a D2D ID received through paging in step S703 or through the D2D discovery request in step S711) and information about the channel between the UEs measured through the discovery signal. If discovery fails, UE 2 may report discovery failure to the base station through the D2D discovery report message.

For a UE in the idle mode to perform the process of discovering a counterpart UE as in the example of FIG. 7, the UE needs to perform the process of connection establishment with the base station. If the UE fails to discover the counterpart UE, the process of connection establishment and the process of reporting discovery failure to the base station may be unnecessary. Accordingly, the process of connection establishment and the process of reporting discovery failure may be omitted, which will be described with reference to FIG. 8.

Figure 8:
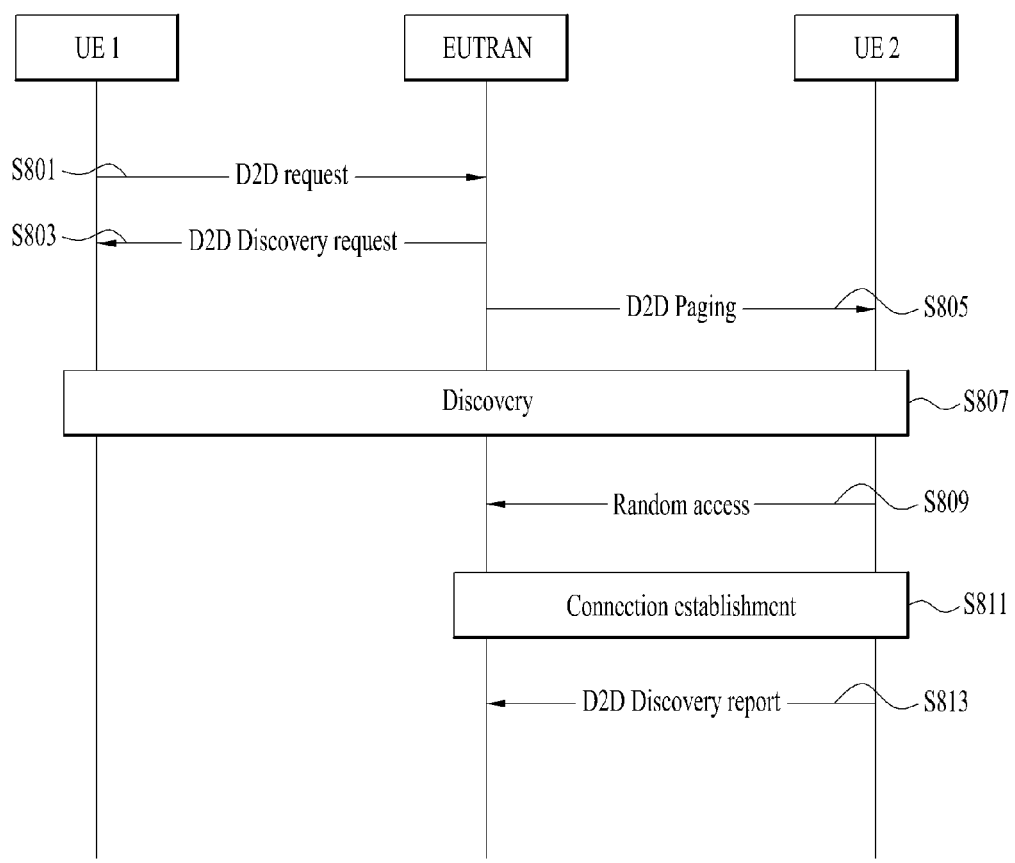

FIG. 8 is a diagram illustrating a discovery procedure for D2D communication according to one embodiment of the present invention. In FIG. 8, it is assumed that the UE 2 is currently in the idle mode, and UE 1 transmits a discovery signal to UE 2.

Referring to FIG. 8, UE 1 (a source UE) intending to perform D2D communication transmits a D2D request message to the base station (S801). The D2D request may or may not include the ID of a counterpart UE which UE 1 intends to perform D2D communication with.

Upon receiving the D2D request message, the base station transmits a D2D discovery request message to UE 1 (S803). The D2D discovery request message may include D2D configuration information for transmission and reception of a discovery signal. In addition, the D2D configuration information may be transmitted through higher layer signaling (e.g., RRC signaling). In this case, transmitting the discovery request message as in step S803 may be omitted.

Since UE 2 (a target UE), which is the counterpart UE, is in the idle mode, the base station transmits paging (e.g., PDCCH) to UE 2 at a determined time in order to wake up UE 2 (S805). The paging may include a D2D ID (an ID of the UE (UE 1) having transmitted the D2D request in step S801 or a service ID) and/or discovery configuration information.

Upon receiving a P-RNTI or DP-RNTI corresponding to the paging message over the PDCCH, the target UE (UE 2) checks a paging detail included in a PDSCH RB region indicated by the PDCCH to determine whether the paging detail is intended therefor (namely, whether the detail coincides with the ID of UE 2). If it is determined that the paging detail is intended for UE2, UE 2 wakes up by switching from the idle mode to the active mode and performs the discovery procedure while monitoring a discovery signal through the resource allocated by the base station (S807). Meanwhile, UE 1 transmits the discovery signal through the resource allocated by the base station in step S803.

When UE 2 succeeds in discovering UE 1, UE 2 performs the random access procedure with the base station (S809). Subsequently, UE 2 performs connection setup/establishment with the base station (S811).

When UE 2 completes the connection establishment procedure with the base station, UE2 transmits a D2D discovery report message to the base station since UE 1 has already transmitted the discovery signal to UE 2 (S813). Herein, the D2D discovery report message may contain information about whether or not discovery is successful (a D2D ID received through the paging message in step S805) and information about the channel between the UEs measured through the discovery signal. If the discovery fails, UE 2 may report the discovery failure to the base station through the D2D discovery report message.

In the example of FIG. 8, since the paging process and the discovery process are combined unlike in the example of FIG. 7, more energy-efficient operation may be defined when discovery fails. This is because unnecessary processes of connection establishment and reporting of discovery failure to the base station may be omitted when a UE fails to discover a counterpart UE. Accordingly, if the UE fails to discover the counterpart UE, it may switch back to the idle mode without performing the random access procedure. Hereinafter, description will be given of UE operations performed when the target UE succeeds in discovering the source UE and when the target UE fails to discover the source UE, with reference to FIGS. 9 and 10.

Figure 9:
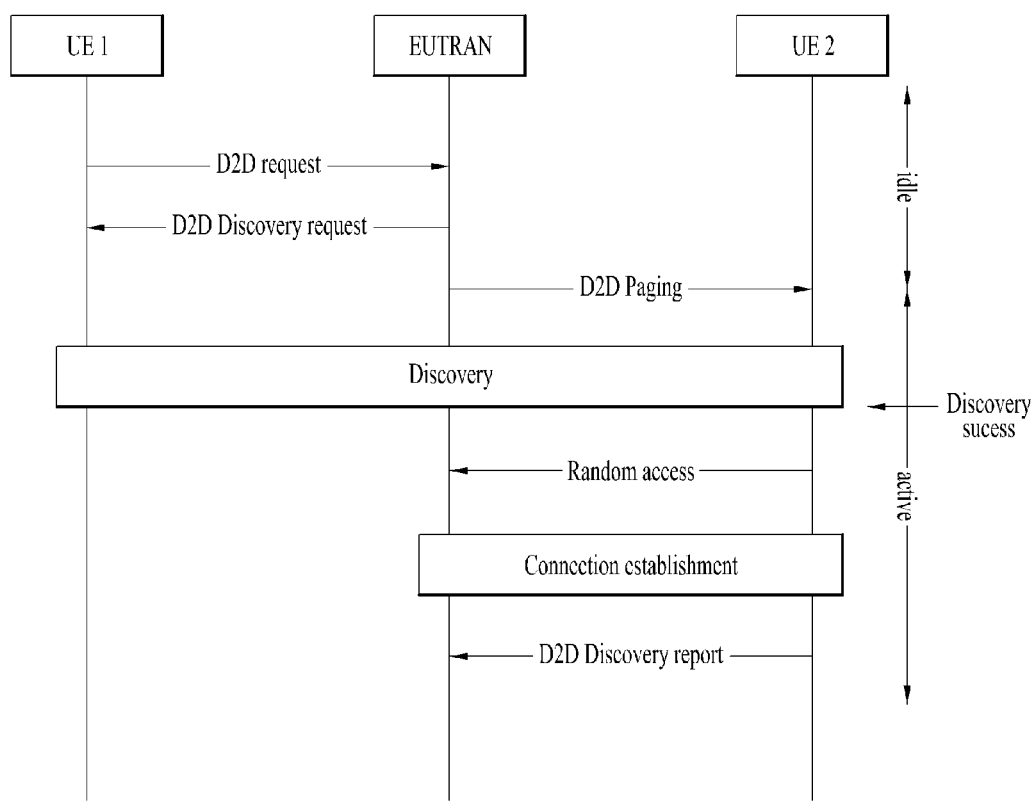
Figure 10:
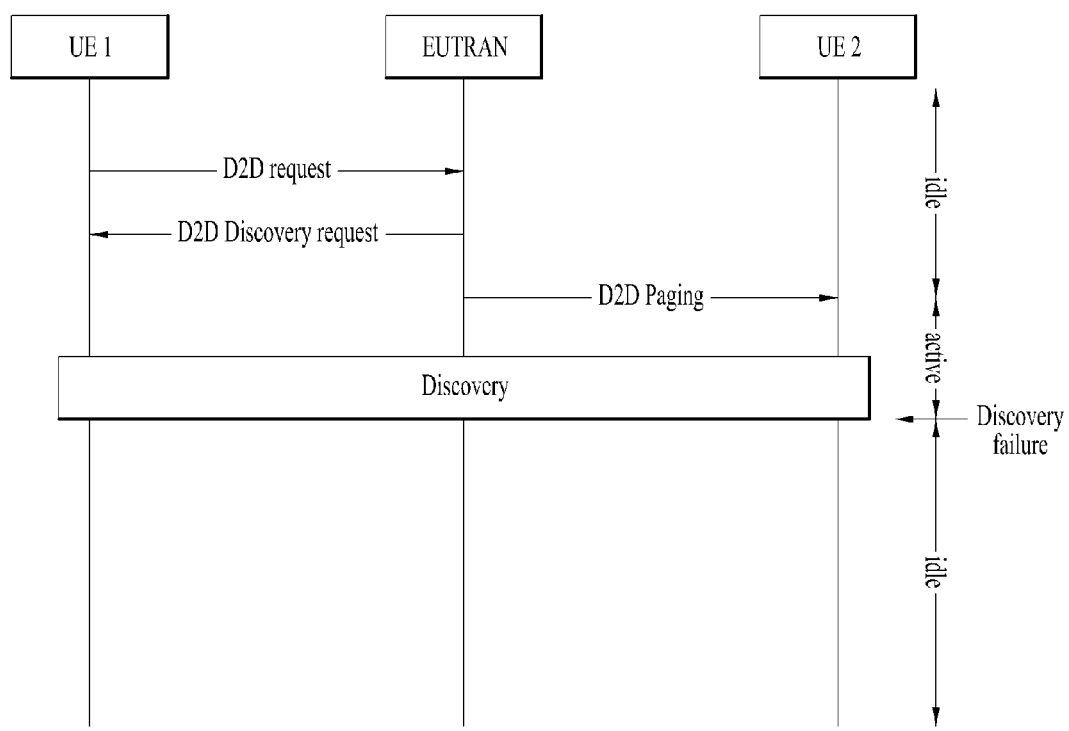

FIGS. 9 and 10 are diagrams illustrating a discovery procedure for D2D communication according to one embodiment of the present invention.

FIG. 9 illustrates a case in which the source UE succeeds in discovering the target UE in the example of FIG. 8, and FIG. 10 illustrates a case in which the source UE fails to discover the target UE in the example of FIG. 8.

Referring to FIG. 9, if the target UE (UE 2) wakes up by switching from the idle mode to the active mode, and succeeds in discovering the counterpart UE (namely, if the target UE receives a discovery signal transmitted from the source UE), the target UE performs the random access procedure with the base station and remains in the active mode. In other words, if the target UE (UE 2) initiates the random access procedure in response to paging, the base station may determine that the UEs (UE 1 and 2) have succeeded in discovering the counterpart UE.

On the other hand, if the target UE (UE 2) wakes up by switching from the idle mode to the active mode and monitors a discovery signal transmitted from the source UE, but fails to discover the counterpart UE (namely, if the target UE fails to receive the discovery signal transmitted from the source UE), the target UE (UE 2) switches from the active mode back to the idle mode without performing the random access procedure. If the target UE (UE 2) does not perform the random access procedure in response to the paging, the base station may determine that the UEs (UE 1 and 2) have failed to discover the counterpart UE.

When the target UE does not respond to the paging message, namely when the UEs (UE 1 and 2) fail to discover the counterpart UE, the base station may incorrectly determine that the target UE is not currently present in the tracking area and keep performing paging by expanding the tracking area. However, since the base station transmitting the paging is usefully capable of pre-recognizing whether the paging is related to D2D discovery or is conventional paging, it may determine the discovery failure rather than continuing to performing paging. For example, if there is no response received from the target UE for a predetermined time after transmission of the paging message or there is no response from the target UE for a certain number of pagings, the base station may determine that the discovery has failed.

The target UE having received the D2D paging message may discover the discovery signal which is based on a UE ID (or a service ID) indicated by the D2D information, or transmit, to the source UE, a discovery signal which is based on the UE ID (or a service ID) thereof. Herein, the D2D information (or paging information/discovery information), which is contained in a D2D paging or D2D discovery request, may include indication information about the transmit mode (Tx mode) or receive mode (Rx mode). The indication information may be constructed by 1 bit. For example, if the value of the bit is 0 (mode=0), operation may be performed in the Rx mode. If the value of the bit is 1 (mode=1), operation may be performed in the Tx mode. A PDCCH using different RNTI values for the Tx mode and the Rx mode may be defined. If the Tx mode is set, and a discovery signal is generated based on the UE ID, the D2D ID may be omitted from the D2D information. On the other hand, a D2D ID different from the UE IDs of UEs belonging to a D2D pair (a source UE and a target UE) may be signaled. Hereinafter, description will be given of a process leading to reporting of discovery success in a case in which the Tx/Rx mode is set to the Rx mode and in another case in which the Tx/Rx mode is set to the Tx mode, with reference to FIGS. 11 and 12.

Figure 11:
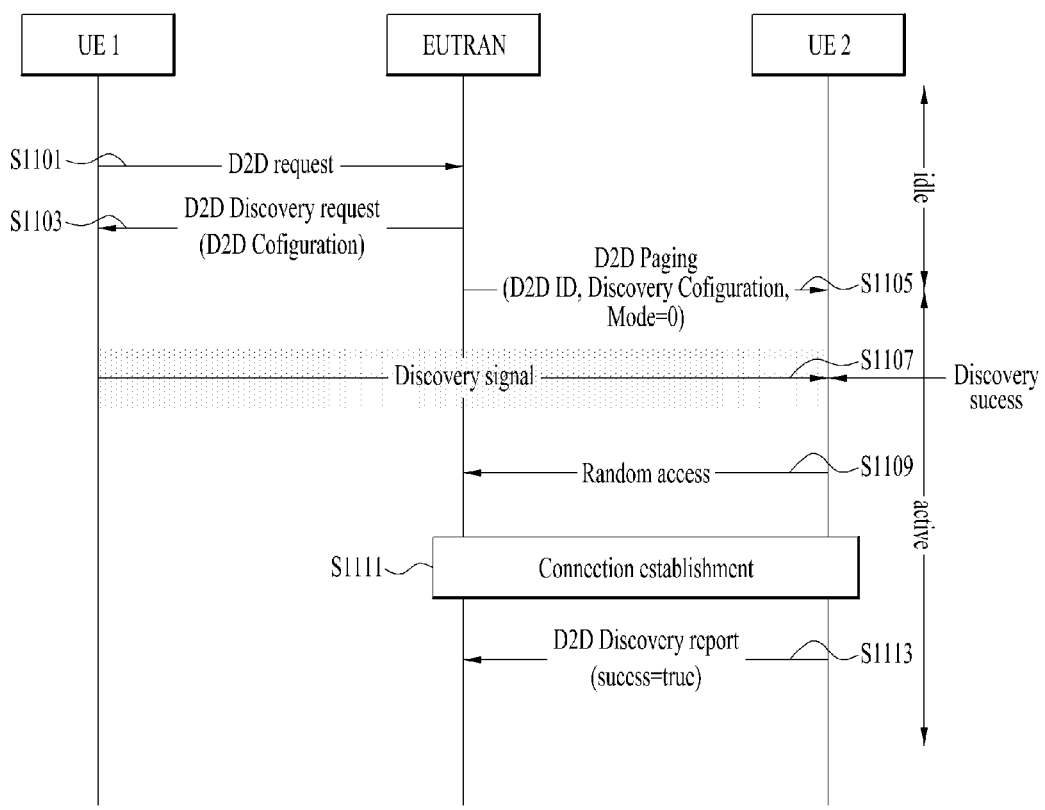
Figure 12:
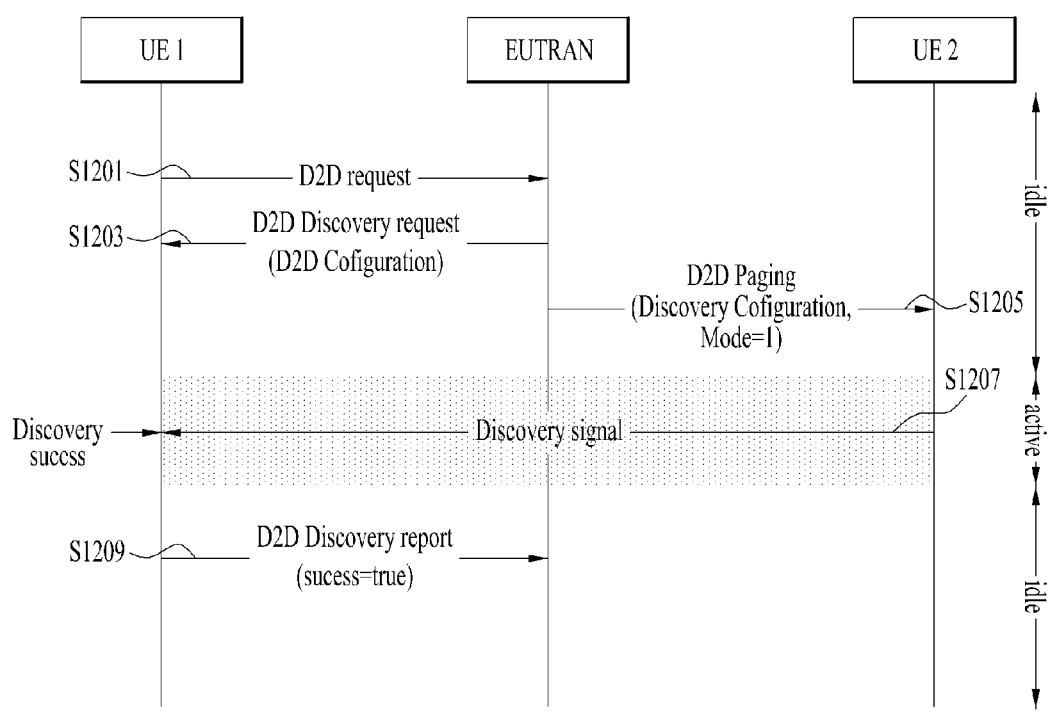

FIGS. 11 and 12 are diagrams illustrating a discovery procedure for D2D communication according to one embodiment of the present invention.

FIG. 11 illustrates operation of the target UE (UE 2) having received paging which is performed in the Rx mode.

Referring to FIG. 11, UE 1 (a source UE) intending to perform D2D communication transmits a D2D request message to the base station (S1101). The D2D request may or may not include the ID of a counterpart UE which UE 1 intends to perform D2D communication with.

Upon receiving the D2D request message, the base station transmits a D2D discovery request message to UE 1 (S1103). The D2D discovery request message may include D2D configuration information for transmission and reception of a discovery signal. In addition, the D2D configuration information may be transmitted through higher layer signaling (e.g., RRC signaling). In this case, transmitting the discovery request message as in step S1103 may be omitted.

Since UE 2 (a target UE), which is the counterpart UE, is in the idle mode, the base station transmits a paging (e.g., PDCCH) message to UE 2 at a predetermined time in order to wake up UE 2 (S1105). The paging message may include a D2D ID (an ID of the UE (UE 1) having transmitted the D2D request in step S701 or a service ID), discovery configuration information, and indication information about the Tx mode/Rx mode. In addition, as described above, the PDCCH used for paging may use RNTI values distinguished from each other with respect to the Tx mode and the Rx mode. In this case, the message may not include the indication information about the Tx mode/Rx mode.

Upon receiving a P-RNTI or DP-RNTI corresponding to the paging message over the PDCCH, the target UE (UE 2) checks a paging detail included in a PDSCH RB region indicated by the PDCCH to determine whether the paging detail is intended therefor (namely, whether the detail coincides with the ID of UE 2). If it is determined that the paging detail is intended for UE 2, UE 2 wakes up by switching from the idle mode to the active mode and performs the discovery procedure while monitoring a discovery signal through the resource allocated by the base station (S1107). Meanwhile, UE 1 transmits the discovery signal through the resource allocated by the base station in step S1103.

When the target UE (UE 2) receives the discovery signal from UE 1, it performs the random access procedure with the base station, remaining in the active mode (S1109). Subsequently, UE 2 performs connection setup/establishment with the base station (S1111).

When UE 2 completes the connection establishment procedure with the base station, UE2 transmits a D2D discovery report message to the base station since UE 1 has already transmitted the discovery signal to UE 2 (S1113). Herein, the D2D discovery report message may contain information about whether or not the discovery is successful (a D2D ID received through the paging message in step S1105 or 'success'=true) and information about the channel between the UEs measured through the discovery signal. If discovery fails, UE 2 may report discovery failure to the base station through the D2D discovery report message.

FIG. 12 illustrates operation of the target UE (UE 2) having received paging which is performed in the Tx mode.

Referring to FIG. 12, UE 1 (a source UE) intending to perform D2D communication transmits a D2D request message to the base station (S1201). The D2D request may or may not include the ID of a counterpart UE which UE 1 intends to perform D2D communication with.

Upon receiving the D2D request message, the base station transmits a D2D discovery request message to UE 1 (S1203). The D2D discovery request message may include D2D configuration information for transmission and reception of a discovery signal and/or the ID of the target UE transmitting the discovery signal. In addition, the D2D configuration information may be transmitted through higher layer signaling (e.g., RRC signaling). In this case, transmitting the discovery request message as in step S1103 may be omitted.

Since UE 2 (a target UE), which is the counterpart UE, is in the idle mode, the base station transmits a paging (e.g., PDCCH) message to UE 2 at a predetermined time in order to wake up UE 2 (S1205). The paging may include the discovery configuration information of S1201 and indication information about the Tx mode/Rx mode. Unlike the previously described Rx mode, the paging may not include the D2D ID (an ID of the UE (UE 1) having transmitted the D2D request in step S701 or a service ID) if the target UE (UE 2) having received paging transmits the discovery signal. In the example of FIG. 12, it is assumed that the discovery signal is generated based on the ID of the UE transmitting the discovery signal. In this case, the D2D ID may be omitted. In addition, if a designated discovery signal is used in a predetermined resource region, the discovery configuration information may also be omitted.

Upon receiving a P-RNTI or DP-RNTI corresponding to the paging message over the PDCCH, the target UE (UE 2) checks a paging detail included in a PDSCH RB region indicated by the PDCCH to determine whether the paging detail is intended therefor (namely, whether the detail coincides with the ID of UE 2). If it is determined that the paging detail is intended for UE 2, UE 2 wakes up by switching from the idle mode to the active mode and transmits a discovery signal through the resource allocated by the base station (S1207). Meanwhile, UE 1 performs the discovery procedure while monitoring the discovery signal through the resource allocated by the base station in step S1203.

Thereafter, UE 1 transmits a D2D discovery report message to the base station (S1209). Herein, the D2D discovery report message may contain information about whether or not the discovery is successful (the ID of the target UE received in step S1203 or success='true') and information about the channel between the UEs measured through the discovery signal.

If the target UE having received the paging transmits the discovery signal, only one UE performs connection establishment regardless of whether or not discovery is successful. In other words, if the paging is about the Rx mode, the paged UE, i.e., the target UE (UE 2) needs to report whether or not reception of the discovery signal is successful, and therefore the procedure of connection establishment with the base station illustrated in FIG. 11 is needed. On the other hand, if the paging is about the Tx mode, the source UE (UE 1) reports whether or not discovery is successful to the base station, and therefore the paged UE (UE 2) is not required to perform reporting. Accordingly, the target UE (UE 2) may not perform the unnecessary connection establishment procedure.

Figure 13:
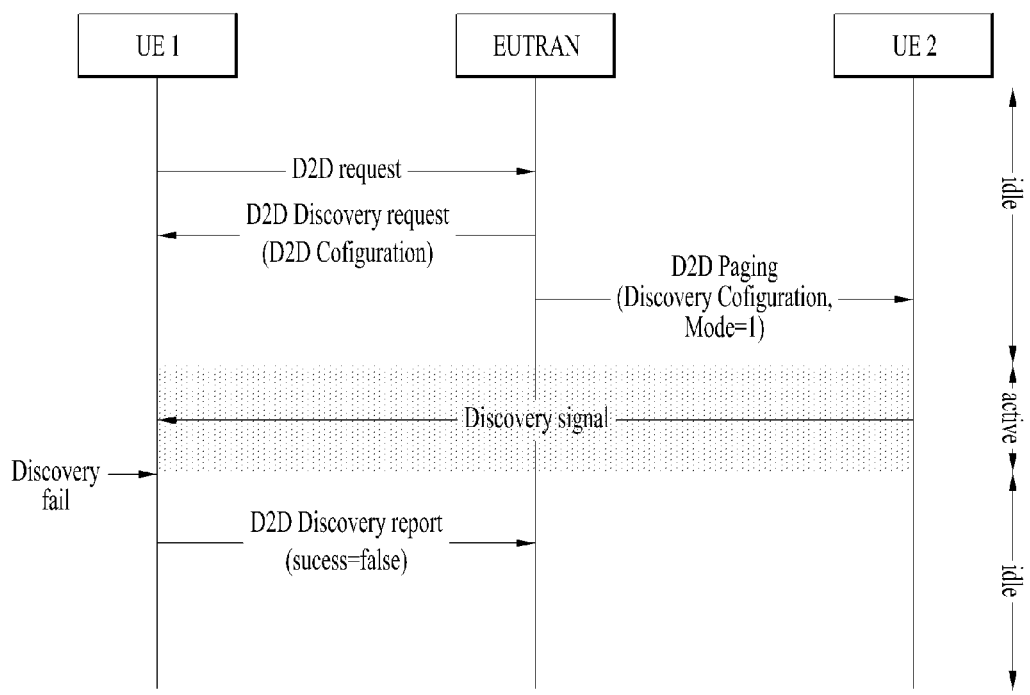

Even if discovery fails, the paged UE (i.e., the target UE) may exclude determination uncertainty, which occurs in switching to the idle mode, without reporting the failure. This case will be described with reference to FIG. 13. FIG. 13 is a diagram illustrating a discovery procedure for D2D communication according to one embodiment of the present invention.

FIG. 13 illustrates a case in which the source UE transmits a D2D discovery report message to the base station when the UE fails to discover the counterpart UE in the example of FIG. 12. That is, UE 1 may transmit a D2D discovery report message even if it fails to discover UE 2. Herein, the D2D discovery report may include information indicating whether or not discovery is successful (the ID of the target UE or success='false'). The report may further include information about the channel measured through the discovery signal. In this case, the target UE (UE 2) may switch to the idle mode after the predetermined signaling interval.

In the case in which the paging is about the Tx mode as illustrated in FIG. 13 (namely, the target UE transmits a discovery signal), even when the target UE (UE 2) switches to the idle mode (due to failure of discovery) after a predetermined signaling interval, the result of discovery may be ensured to be reported to the base station regardless of whether or not discovery is successful, namely, even if discovery fails because the counterpart UE (i.e., the source UE) is responsible for the reporting. Accordingly, even if discovery fails, determination uncertainty, which may occur when the paged UE (i.e., the target UE) switches to the idle mode without reporting failure, may be excluded.

Even in a case other than the case in which the Tx mode is set (namely, when the target UE transmits a discovery signal), D2D information (or paging information/discovery information) may not include a D2D ID. For example, in a case in which the Rx mode is set, the D2D ID may not be included in the D2D information if the target UE pre-recognizes the D2D ID (the ID of the source UE that transmits the discovery signal).

In some cases, the discovery configuration information included in the D2D information may not include any information, or may include information about resources (time and/or frequency) on which the discovery signal is transmitted and information about the discovery signal. For example, in designing a discovery signal, if the type of the discovery signal (e.g., UL-SRS, UL (or DL)-DMRS, a new sequence defined for discovery, and the like) is predetermined, and the resource information about the discovery signal including a time domain resource (e.g., a subframe (or slot) set and an OFDM symbol) and a frequency domain resource (e.g., an RB set), an antenna port number, and a sequence parameter can be specified by being mapped to a D2D ID, D2D information only needs to include the D2D ID as information. That is, the D2D information may not include either D2D configuration or discovery configuration information.

Table 1 shows formats of the D2D information included in the paging detail.

TABLE 1

| D2D information (Paging information/discovery information) | | |
|---|---|---|
| | D2D ID | D2D/discovery configuration |
| Format 1 | — | 1-bit indicator (This may not be included if a DP-RNTI is used or a D2D configuration/discovery configuration are transmitted through a D2D discovery request message.) |
| Format 2 | Peer UE ID | — |
| Format 3 | Peer UE ID | Time domain resource information (e.g., a radio frame/subframe number) |
| Format 4 | Peer UE ID | Discovery signal type, resource information (e.g., a radio frame/subframe number, tone, symbol, sequence mapping rule, etc.) |

Referring to Table 1, D2D information included in the paging detail described above may include a D2D ID and D2D configuration information.

In Table 1, the peer UE ID represents an ID of a UE transmitting a discovery signal, and may include multiple IDs. This corresponds to a case in which multiple UEs make D2D request or a case in which an ID set of a UE providing a specific service is included.

First, the D2D information may not include a peer UE ID, and the D2D configuration information may include only 1-bit indicator, as Format 1. The 1-bit indicator is used to distinguish paging from the existing paging when the D2D information included in the paging detail includes no information. For example, if the value of the 1-bit indicator is 0 (indicator=0), this indicates the existing paging. If the values of the 1-bit indicator is 1 (indicator=1), this indicates paging for D2D communication. In addition, if a DP-RNTI dedicated to D2D is used, the 1-bit indicator may be omitted.

The D2D information may include only a peer UE ID as Format 2. The D2D information may include a peer UE ID and discovery configuration information, but the discovery configuration information may include only the transmission time domain resource information (e.g., a radio frame/subframe number), as in the case of Format 3. The D2D information may include a peer UE ID and discovery configuration information, and the discovery configuration information may include a discovery signal type and resource information (e.g., a radio frame/subframe number, tone, symbol, sequence mapping rule, etc.), as Format 4.

As described above, the information included in the D2D information may be different between formats, be specifically defined as the format number thereof increases. That is, the D2D information of Format 1 represents only a command to execute discovery. On the other hand, the D2D information of Format 4 informs of a D2D ID and a mapping rule to be used to derive a sequence of a discovery signal, and a resource region in which the discovery signal is transmitted. This has an effect of saving time and energy taken for discovery by specifying the discovery range of the receive UE in the case in which a D2D capable or registered D2D ID set and a resource region in which discovery signal transmission is possible are predetermined. However, as more detailed information needs to be delivered, signaling overhead increases, computation in the base station becomes complex, and the operation of the UE becomes more restricted.

The difference in information included in the D2D information between formats may be caused by design of a discovery signal. This is related to a question of what kind of information is needed to specify the form and position of a discovery signal. As the number of factors reflected in designing the signal decreases, the possible forms and positions of the signal may be restricted. Accordingly, the information indicated by paging may also become restrictive. In other words, if only the peer UE ID is used to determine the sequence of a discovery signal and the transmission time of the discovery signal, the range of the transmission time which can be derived from the peer UE ID through calculation may be restricted. On the other hand, if the transmission time of the discovery signal is defined independently of the peer UE ID, the range thereof may be further widened. In this case, discovery resources may be more independently allocated with respect to different D2D IDs. For example, in the case in which a transmission radio frame/subframe of a D2D discovery signal is derived from the peer UE ID, the discovery configuration information may take the form as Format 2 which is in contrast with Format 3, in which discovery configuration information and transmission radio frame/subframe information, which is additional information, are delivered.

Herein, even if the same discovery signal design method is used, only partial information may be delivered to the UE by using different formats. In this case, the information that is not delivered may be discovered in a possible range, which may be a predetermined value or range. For example, if the D2D information includes only the peer UE ID as in the case of Format 2, the UE may be allowed to monitor the discovery signal within a range of, for example, a predetermined sequence type or parameter. Further, even if the D2D information includes transmission resource information on the discovery signal as in the case of Format 3, it may include only information about a frequency region. In this case, the UE may monitor the discovery signal every unit time (e.g., a subframe or radio frame) in the frequency region.

Alternatively, a predetermined value may be used for the information that is not delivered. As in the case of Format 1 in Table 1, the transmission position and form of the discovery signal may be predetermined while the D2D information does not include any information (except the 1-bit indicator). In other words, a pre-recognized value may be used to derive the sequence of the discovery signal without separate signaling because a peer UE ID set to perform D2D communication is, for example, pre-agreed or determined by being linked to paging timing. For example, the base station may allocate the same paging frame and paging offset to a UE group subscribed to the same service, and the service ID may be linked to the paging frame and paging offset. The resource region of the discovery signal may also be predetermined. That is, the format of the paging information may depend on the range of the predetermined value.

The descriptions given above are not limited to D2D paging for UEs in the idle mode. They may be applied to UEs in any state mode. However, if the UE is in a mode different from the idle mode, the proposed method of changing the state mode to the idle mode in case of discovery failure is not applied. Further, the D2D information described above may be delivered in the form of higher layer signaling (e.g., RRC signaling) rather than through a paging message.

Fundamentals of Devices to which the Present Invention is Applicable

Figure 14:
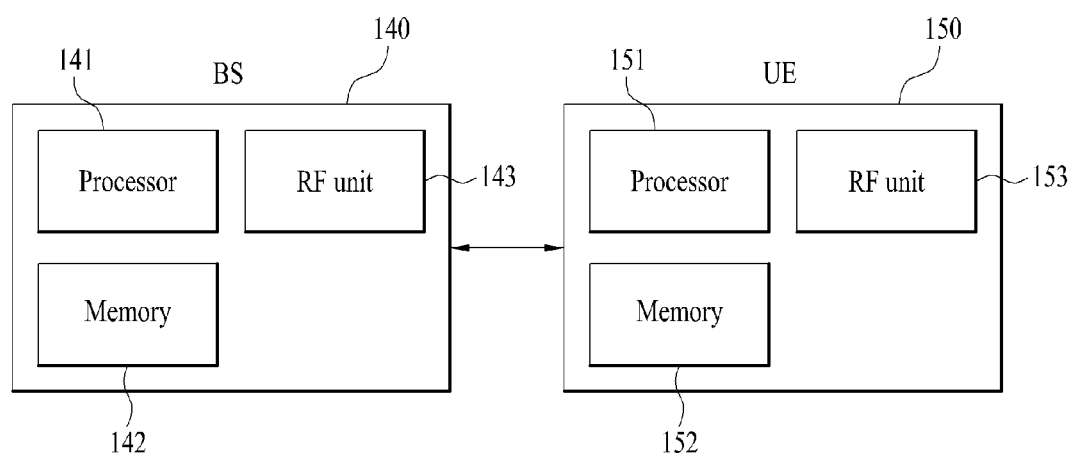
FIG. 14 is a block diagram illustrating a wireless communication device according to one embodiment of the present invention.

FIG. 14 is a block diagram illustrating a wireless communication device according to one embodiment of the present invention Referring to FIG. 14, a wireless communication system includes a BS 140 and multiple UEs 150 positioned within the coverage of the BS 140.

The BS 140 includes a processor 141, a memory 142, and a radio frequency (RF) unit 143. The processor 141 implements the proposed functions, processes, and/or methods. Layers of the wireless interface protocol may be implemented by the processor 141. The memory 142 is connected to the processor 141 to store various kinds of information for driving the processor 141. The RF unit 143 is connected to the processor 141 to transmit and/or receive a radio frequency signal.

A UE 150 includes a processor 151, a memory 152, and a RF unit 153. The processor 151 implements the proposed functions, processes, and/or method. Layers of the wireless interface protocol may be implemented by the processor 151. The memory 152 is connected to the processor 151 to store various kinds of information for driving the processor 151. The RF unit 153 is connected to the processor 151 to transmit and/or receive a radio frequency signal.

The memory 142, 152 may be disposed inside or outside the processor 141, 151, and be connected to the processor (141, 151) by a well-known means. In addition, the BS 140 and/or the UE 150 may have a single antenna or multiple antennas.

In the embodiments described above, elements and features of the present invention are combined in a predetermined form. The elements or features should be considered optional unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced with elements or features from another embodiment. It is apparent that some of claims which do not have a dependency relationship explicitly stated may be combined to configure an embodiment or may be incorporated into a new claim through amendment after filing of this application.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to an embodiment of the present invention may be embodied as a module, a procedure, or a function that performs the functions or operations described above. Software code may be stored in a memory and executed by a processor. The memory is located at the interior or exterior of the processor and may transmit and receive data to and from the processor via various known means.

It is apparent to those skilled in the art that the present invention may be carried out in other specific ways than those set forth herein without departing from the essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

Various embodiments of the present invention have been described above, mainly focusing on examples applied to a 3GPP LTE system. However, the embodiments of the present invention described above are also equally applicable to various mobile communication systems other than the 3GPP LTE system.

The invention claimed is:

1. A method for performing device discovery for device-to-device (D2D) communication in a wireless access system supporting the D2D communication, the method comprising:
receiving, by a first device in an idle mode, a paging message including discovery configuration information from a base station, the discovery configuration information indicating one of a receive mode and a transmission mode in relation to a discovery signal;
switching, by the first device, to an active mode when the paging message indicates the first device;
performing, by the first device, a random access procedure with the base station for reporting a D2D discovery report message including a D2D discovery result when the discovery configuration information indicates the receive mode and the first device receives the discovery signal from a second device requesting the D2D communication; and
transmitting, by the first device, the discovery signal to the second device and then switching to the idle mode without performing the random access procedure when the discovery configuration information indicates the transmission mode,
wherein when the discovery configuration information indicates the receive mode and the first device does not receive the discovery signal from the second device, the first device does not perform the random access procedure and switches to the idle mode, and
wherein when the discovery configuration information indicates the transmission mode, the first device generates the discovery signal based on an identifier of the first device and the first device does not report the D2D discovery report message.

2. The method according to claim 1, wherein the paging message comprises an identifier (ID) of the second device or a service ID related to the first device.

3. The method according to claim 1, wherein the paging message comprises at least one of an indicator for indicating that the paging message is intended for the D2D communication, resource information used to transmit the discovery signal, type information about the discovery signal, an antenna port number for transmission of the discovery signal and a sequence parameter of the discovery signal.

4. The method according to claim 1, wherein the paging message is transmitted over a physical downlink control channel (PDCCH), the PDCCH using a D2D-paging-radio network temporary identifier (DP-RNTI).

5. The method according to claim 1, wherein the D2D discovery report message comprises at least one indication information indicating that discovery of the first device is successful and channel information measured through the discovery signal.

6. A first device for performing device discovery for device-to-device (D2D) communication in a wireless access system supporting the D2D communication, the first device comprising:
a radio frequency (RF) unit configured to transceive a radio signal; and
a processor,
wherein the processor is configured to:
receive a paging message including discovery configuration information from a base station while the first device is in an idle mode, the discovery configuration information indicating one of a receive mode and a transmission mode in relation to a discovery signal,
switch the first device to an active mode when the paging message indicates the first device,
perform a random access procedure with the base station for reporting a D2D discovery report message including a D2D discovery result when the discovery configuration information indicates the receive mode and the first device receives the discovery signal from a second device requesting the D2D communication, and
transmit a discovery signal to the second device and then switch to the idle mode without performing the random access procedure when the discovery configuration information indicates the transmission mode,
wherein when the discovery configuration information indicates the receive mode and the processor does not receive the discovery signal from the second device, the processor does not perform the random access procedure and switches to the idle mode, and
wherein when the discovery configuration information indicates the transmission mode, the processor generates the discovery signal based on an identifier of the first device and the processor does not report the D2D discovery report message.

7. The first device according to claim 6, wherein the paging message comprises an identifier (ID) of the second device or a service ID related to the first device.

8. The first device according to claim 6, wherein the paging message comprises at least one of an indicator for indicating that the paging message is intended for the D2D communication, resource information used to transmit the discovery signal, type information about the discovery signal, an antenna port number for transmission of the discovery signal and a sequence parameter of the discovery signal.

9. The first device according to claim 6, wherein the paging message is transmitted over a physical downlink control channel (PDCCH), the PDCCH using a D2D-paging-radio network temporary identifier (DP-RNTI).

10. The first device according to claim 6, wherein the D2D discovery report message comprises at least one indication information indicating that discovery of the first device is successful and channel information measured through the discovery signal.

* * * * *